(12) United States Patent
Kamboh et al.

(10) Patent No.: US 7,869,442 B1
(45) Date of Patent: Jan. 11, 2011

(54) METHOD AND APPARATUS FOR SPECIFYING IP TERMINATION IN A NETWORK ELEMENT

(75) Inventors: Ameel Kamboh, Billerica, MA (US); David Tsang, Sudbury, MA (US)

(73) Assignee: Nortel Networks Limited, Mississauga, Ontario (CA)

( * ) Notice: Subject to any disclaimer, the term of this patent is extended or adjusted under 35 U.S.C. 154(b) by 814 days.

(21) Appl. No.: 11/241,612

(22) Filed: Sep. 30, 2005

(51) Int. Cl.
*H04L 12/56* (2006.01)
(52) U.S. Cl. .............................. 370/400; 726/1; 726/3
(58) Field of Classification Search ................ 370/389, 370/395.43, 360, 230
See application file for complete search history.

(56) References Cited

U.S. PATENT DOCUMENTS

| | | | |
|---|---|---|---|
| 6,539,483 B1* | 3/2003 | Harrison et al. ................ 726/1 |
| 6,542,508 B1* | 4/2003 | Lin ........................ 370/395.43 |
| 6,587,466 B1* | 7/2003 | Bhattacharya et al. . 370/395.21 |
| 6,594,268 B1 | 7/2003 | Aukia et al. |
| 6,598,034 B1* | 7/2003 | Kloth .......................... 706/47 |
| 6,625,150 B1* | 9/2003 | Yu ............................. 370/389 |
| 6,789,118 B1* | 9/2004 | Rao ........................... 709/225 |
| 7,028,098 B2* | 4/2006 | Mate et al. .................. 709/238 |
| 7,162,545 B2 | 1/2007 | Sudo |
| 7,203,744 B1* | 4/2007 | Parekh et al. ............... 709/223 |
| 7,370,100 B1* | 5/2008 | Gunturu ..................... 709/223 |
| 7,403,525 B2* | 7/2008 | Sano et al. .................. 370/392 |
| 7,424,014 B2 | 9/2008 | Mattes et al. |
| 2002/0124086 A1* | 9/2002 | Mar .......................... 709/226 |
| 2004/0078621 A1* | 4/2004 | Talaugon et al. ............... 714/4 |
| 2006/0013136 A1* | 1/2006 | Goldschmidt et al. ....... 370/235 |
| 2006/0224883 A1* | 10/2006 | Khosravi et al. ............ 713/151 |

OTHER PUBLICATIONS

Co-pending related U.S. Appl. No. 11/646,693, including office action dated May 15, 2009.

* cited by examiner

*Primary Examiner*—Daniel J Ryman
*Assistant Examiner*—Brian Roberts
(74) *Attorney, Agent, or Firm*—Anderson, Gorecki & Manaras LLP

(57) ABSTRACT

IP applications may be hosted on processors other than the processor on which their associated routing entity is hosted by causing the routing context to be extended to the new processor and causing IP termination to occur at the new processor. Applications may define policies specifying packet attributes and actions to be taken on matching packets, so that packets matching the policy may be directed to a processor hosting the application rather than a processor hosting the routing entity. A steering policy manager may be implemented to receive policies from the applications, verify the policy format and uniqueness vis-à-vis previously implemented policies, and implement the policies by passing the policies to one or more steering policy agents. Filters may be programmed into the data plane or the control plane to cause IP termination to occur on the processor hosting the application.

14 Claims, 4 Drawing Sheets

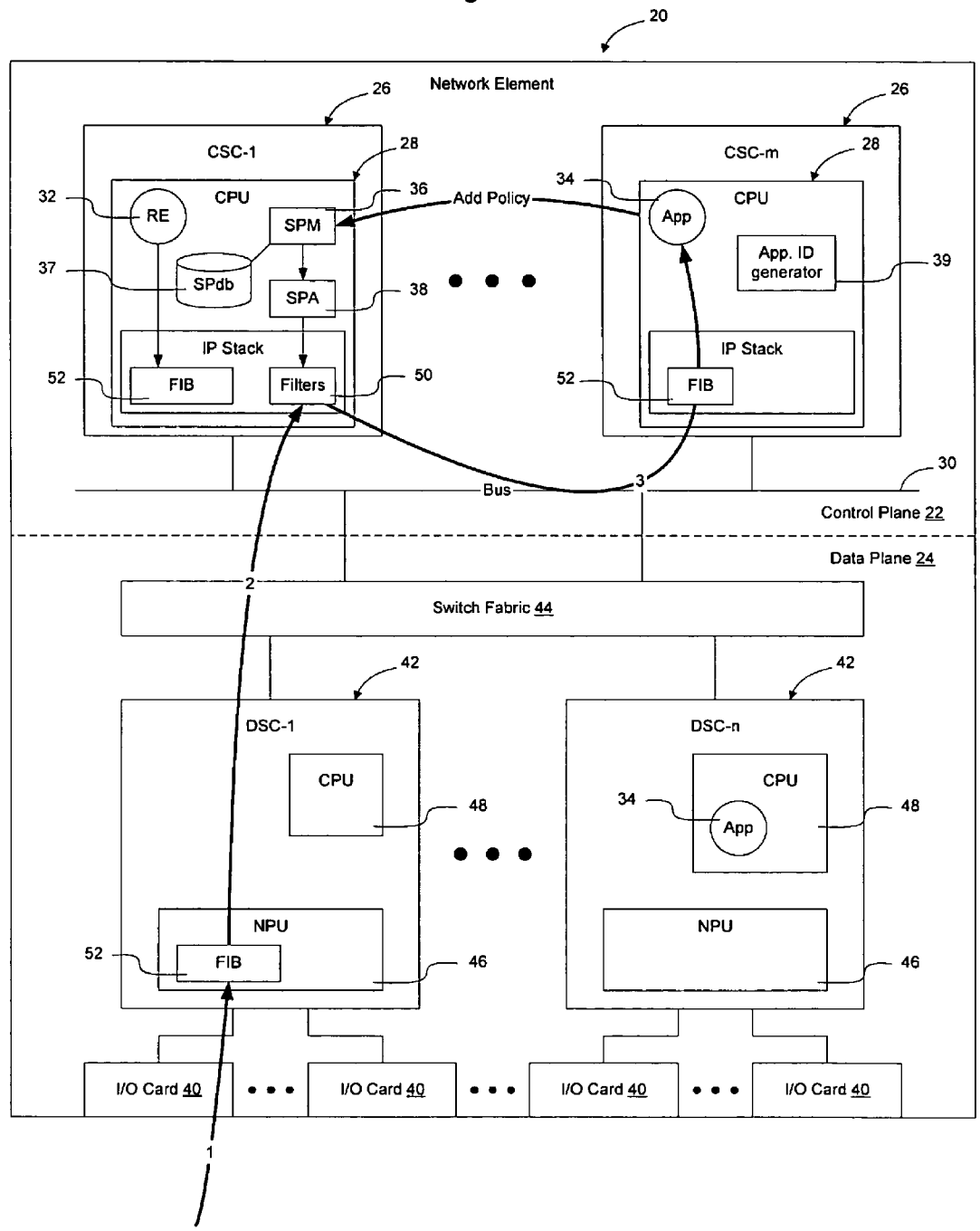

METHOD AND APPARATUS FOR SPECIFYING IP TERMINATION IN A NETWORK ELEMENT

BACKGROUND

1. Field

This application relates to network elements and, more particularly, to a method and apparatus for specifying the manner in which IP termination should occur in a network element.

2. Description of the Related Art

Data communication networks may include many switches, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

FIG. 1 illustrates one example of a communication network 10. As illustrated in FIG. 1, subscribers 12 access the network 10 by interfacing with one or more Provider Edge (PE) network elements 14. The provider edge network elements collect traffic from multiple subscribers and multiplex the traffic onto the network backbone, which includes multiple Provider (P) network elements 16 connected together. The subscribers 12 thus may obtain access to the network 10 to exchange data with other subscribers, to obtain access to networked resources, or otherwise to take advantage of the communication services provided by the communication network.

The network elements on the communication network, such as subscriber gateways 12, provider edge network elements 14, and provider network elements 16, communicate with each other using predefined sets of rules, referred to herein as protocols. Multiple protocols exist, and are used to define aspects of how the communication network should behave, such as how the network elements should identify each other on the network, the format that the data should take in transit, and how the information should be reconstructed once it reaches its final destination. Examples of several protocols include Asynchronous Transfer Mode (ATM), Frame Relay (FR), Ethernet, Transport Control Protocol (TCP), Internet Protocol (IP), Point-to-Point Protocol (PPP), and Multi-Protocol Label Switching (MPLS), although there are probably more than 100 other protocols as well that may be used to govern aspects of communications taking place over the network.

Since the network 10 may be shared by many subscribers 12, it is often important to secure the communications so that one subscriber's use of the network is not visible to other subscribers. One way of doing this is to form a Virtual Private Network (VPN). A VPN is formed by securing communications between two or more networks or network elements to form a VPN tunnel, such as by encrypting or encapsulating transmissions between the networks or network elements. Using VPN tunnels enables information to be exchanged securely between geographically dispersed sites over a network that is otherwise not entirely secure. VPN tunnels thus may be used to secure traffic, for example, across a public network such as the Internet. VPN tunnels may be used in many contexts, however, and securing traffic on the Internet is merely one example of a use for VPN tunnels.

As networks have increased in size and sophistication, the number of tunnels to be supported to a given VPN site has increased dramatically such that a given network element may be required to support many VPN tunnels. For example, a VPN site may wish to establish tunnels to branch offices and may wish to establish client tunnels with individuals or other networks to allow employees, suppliers, and/or subscribers to access resources on the network associated with the VPN site. In this instance, the VPN site may participate simultaneously on hundreds or thousands of branch office and client VPN tunnels.

One way to enable a network element to handle larger numbers of VPN tunnels is to provide multiple processors in the network element. A large network element may include several processors such as CPUs and Network Processing Units (NPUs), to enable it to handle the load placed on the network element by the VPN tunnels.

Depending on the particular protocol to be implemented or service to be offered on a particular VPN, it may be necessary for a network element to start one or more applications within the context of the VPN. These applications will process control and/or data packets to allow particular services to be provided on the VPN. To prevent information from being communicated between VPNs, an instance of each program is generally started for each VPN in which the service is to be provided.

In a network element having multiple processors, a given VPN will be started on one of the processors and a routing entity for that VPN will be established on the processor. Any IP packets associated with the VPN that are to be terminated at the network element will be forwarded to that processor. Accordingly, any application that needs access to IP packets on a particular VPN (IP applications) has conventionally been required to be stared on the same processor as the routing entity for that VPN.

When a network element is configured to have multiple processors, it would be advantageous to allow the load from the network elements to be distributed across the processors. Unfortunately, requiring IP applications to be started by the processor hosting the routing engine inhibits distribution of workload between the processors. Accordingly, this restriction may result in an imbalanced processor work-load distribution.

SUMMARY OF THE DISCLOSURE

Accordingly, it would be advantageous to have an architecture that would enable IP applications to be hosted on processors other than the processor hosting their related routing entity. According to an embodiment of the invention IP applications on a particular VPN are allowed to define policies containing both attributes and actions. The policies will be applied by filtering IP packets received on the VPN to identify IP packets matching the defined attributes. When a matching IP packet is found, the action specified by the policy will be applied to the packet. For example, where the action is to direct the IP packet to a processor other than the processor hosting the routing entity for that VPN, IP termination may be caused to occur on a processor other than the VPN host processor. The routing context from the routing entity will be extended to the new processor so that the redirected IP packets are recognize by the processor hosting the application. Policies may specify information relevant to layers 3 through 5 (i.e. source/destination MAC address, port/protocol, and VPN information).

Policies are defined by IP applications and passed to a steering policy manager that validates the policy against a policy tree. If the policy is unique and valid, the policy is passed to one or more steering policy agents configured to program the filter rules to implement filters associated with the policies. By enabling the applications to specify the IP termination location for particular packets and classes of packets, and by extending the routing context of to the processor hosting the application, it is possible to instantiate the applications in any desired processor rather than requiring the applications to be instantiated in the processor that is hosting the routing entity associated with the application.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

FIG. 2 is a functional block diagram of an example network element according to an embodiment of the invention;

DETAILED DESCRIPTION

Figures 1, 6:
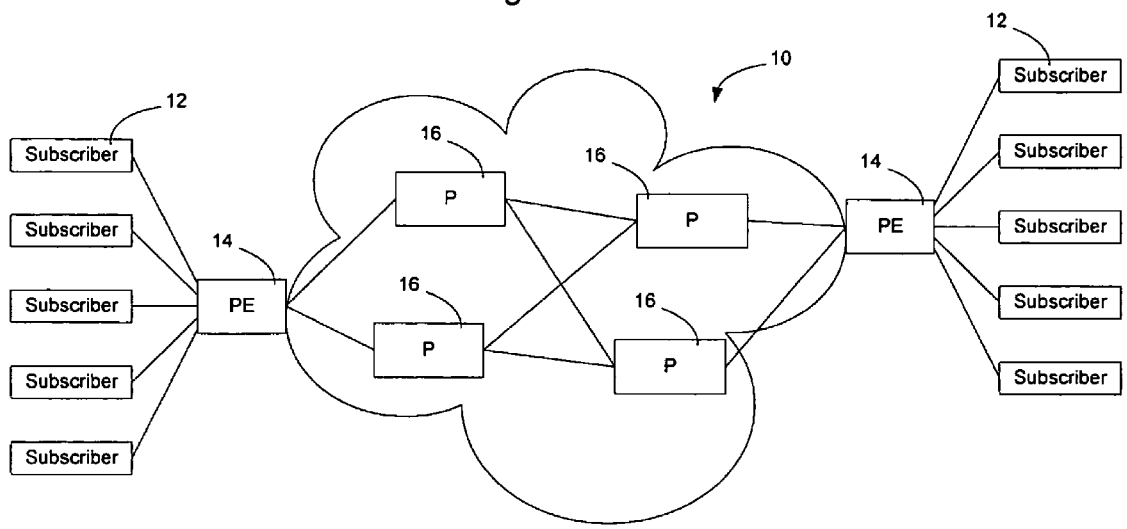
FIG. 1 is a functional block diagram of an example communication network.
FIG. 6 illustrates a policy database that may be included as part of the data structure of FIG. 5.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

FIG. 2 illustrates one embodiment of a network element 20 according to an embodiment of the invention. Although a description of the structure and methods of operation of the embodiment illustrated in FIG. 2 will be provided herein to enable operation of the invention to be understood, the invention is not limited to this particular network element or a network element having a similar architecture, as the invention may be used in connection with network elements such as routers and switches formed using other alternative architectures. The embodiment shown in FIG. 2 may be used as a subscriber gateway network element 12, provider edge network element 14, provider core network element 16, or as another type of network element, on a communication network such as the communication network 10 described above in connection with FIG. 1.

In the embodiment shown in FIG. 2, the network element 20 generally includes a control plane 22 and a data plane 24. The control plane 22 is configured to control operation of the network element 20 by specifying how the data plane 24 should handle particular packets or classes of packets. The control plane generally includes control service cards 26, each of which includes a processor such as a CPU 28. A bus 30 may be provided to interconnect the control service cards 26 to enable data and instructions to be communicated between the CPUs 28 in the control plane 22. The CPUs may host routing entities 32 and IP applications 34. The CPUs 28 may also implement a steering policy management system including a steering policy manager 36 and one or more steering policy agents 38 configured to implement policies specified by the IP applications 34.

The network element 20 also includes a data plane 24 configured to handle packets of data on the communication network. The data plane 24 generally includes one or more Input/Output (I/O) cards 40, one or more data service cards 42, and a switch fabric 44. Packets received over the I/O cards 40 are passed to the data service cards 42, and then to the switch fabric 44. The switch fabric 28 enables a packet entering on a port on one or more I/O cards 22 to be output at a different port in a conventional manner. A packet returning from the switch fabric 28 is received by one or more of the data service cards 42 and passed to one or more I/O cards 40. The packet may be handled by the same data service card 42 on both the ingress and egress paths or may be handled by different data service cards 42 on the ingress and egress paths.

The I/O cards 40 are configured to connect to links in the communications network 10. The I/O cards 40 may include physical interfaces, such as optical ports, electrical ports, wireless ports, infrared ports, or ports configured to communicate with other physical media, as well as configurable logical elements capable of being programmed to implement interface definitions specified by an interface manager.

The data service cards 42 include one or more network processors 46 configured to perform network processing on packets of data received via the I/O cards. The data service cards 42 also include a CPU 48 configured to host applications 34 and to otherwise interface with the control plane 22.

According to an embodiment of the invention, a service policy management system enables applications 34 to create policies specifying how particular packets or classes of packets should be handled, so that IP termination may be caused occur at any desired processor, such as CPU 28 or CPU 48, in the network element 20. Alternate policies may be implemented as well. By allowing IP termination to occur at a processor other than the processor hosting the routing entity, IP applications for that routing entity may be started on any processor on the network element.

Figure 3:
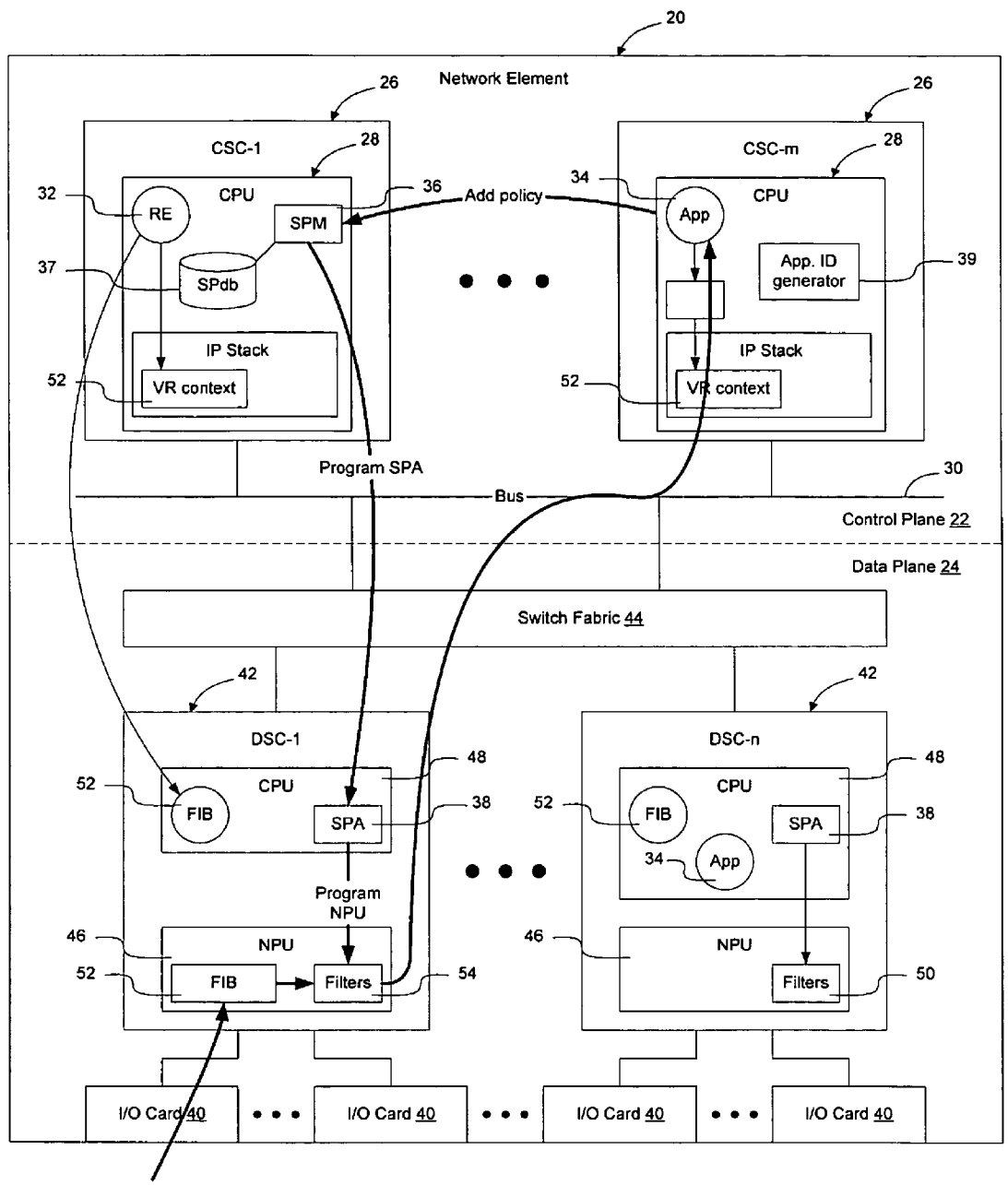
FIG. 3 is a functional block diagram of another example network element according to an embodiment of the invention.

FIGS. 2 and 3 illustrate two embodiments of the invention, one in which filter rules are not able to be programmed into the network processing unit 46 (FIG. 2) and one in which filter rules are able to be programmed in to the network processing unit 46 (FIG. 3). Each of these embodiments will be discussed in greater detail below. The invention is not limited to these particular embodiments, however, as other embodiments and architectures may be used as well.

In the embodiment shown in FIG. 2, a routing entity 32 associated with a VPN is started in a CPU 28 of a first control service card 26 (CSC-1), and an application 34 associated with the routing entity 32 is started in a second CPU 28 of a different control service card 26 (CSC-m). The routing entities may be virtual routers or virtual routing and forwarding (VRF) instances specified in IETF RFC 2547 to allow the network element 20 to support creation and implementation of one or more of the several types of virtual private networks (VPN) services When an IP packet is received by the network element 20, if the IP packet is to be terminated at the network element, the IP packet will be passed by the data plane 24 up to the control plane 22 where it will be directed to the control service card hosting the routing entity. Specifically, in the embodiment shown in FIG. 2, since filter rules cannot be programmed into the network processing unit 46, data packets (arrow 1) received at an I/O card 40 will be handled normally by the data plane and forwarded by the NPU 46 to CSC-1 (arrow 2).

To allow IP termination to occur at CSC-m, the application 34 will specify one or more policies (arrow labeled add policy) which will be passed to a service policy manager 36. The service policy manager will validate the policy (discussed below) and, if valid, pass the policy to one or more service policy agents 38. The service policy agents 38 will cause filters 50 to be created that will allow IP packets meeting the policy attributes to be identified. Once identified, the action associated with the policy will be applied to the packets to cause the packets to be forwarded to a particular identified processor (such as CPU 28 or NPU 46) or to cause the packet to be dropped.

In the embodiment shown in FIG. 2, policies received by the SPA 38 are programmed as filter rules 50 into the IP stack 52 hosting the forwarding information base (FIB) 54 for the routing entity. IP packets forwarded to the IP stack of CSC-1 that match the filter rules associated with the policy will thus be forwarded from CSC-1 to CSC-m over bus 30 to cause IP termination for those packets to occur at a processor other than the processor hosting the routing entity. Information associated with the FIB 52 may be journaled to the IP stack of the other CSC-m so that the IP packets forwarded to CSC-m may be directed to the application 34 resident on that control service card.

FIG. 3 illustrates an alternate embodiment of the invention in which filter rules are able to be programmed into the network processing units 46 of the data service cards 42. In this embodiment, when an application creates a policy, the policy will be passed to the steering policy manager 36, which will validate the policy and pass the policy to the steering policy agents 38. The steering policy agents, in this embodiment, are instantiated in the CPU 48 of the data service cards 42. The steering policy agents program the network processing unit 46 via an API to cause the policy to be converted to filter rules 54 that may be received and applied by the network processing unit 46.

In operation, the NPU will filter received packets to identify whether a packet matches one of the filter rules 54. If a packet does match the filter, the action associated with the policy (which also is programmed into the NPU) is applied to the packet. For example, the action may indicate that the IP packet should be forwarded to the control service card hosting the application (CSC-m). Accordingly, the NPU 46 on the DSC 42 will forward the IP packet to the control service card hosing the application (CSC-m). To enable the control service card to recognize the IP packet as belonging to the application, the VR context will be programmed into the IP stack of that CSC's CPU as discussed above.

Since more than one data service card may receive packets on a given VPN, the policy for a given application will be passed to any data service card that may receive packets on that VPN. For example, where two data service cards are configured to receive or transmit packets via I/O cards having ports assigned to the VPN, an SPA in each of the data service cards would be provided with the policy.

Applications may create policies containing both attributes and actions. The policies may specify filtering criteria (attributes) relevant to layers 3, 4, and/or 5, and may specify an action to be taken on the packets matching those criteria. The attributes may be specific or may contain wild-card values. For example a policy may specify a particular source address (SA) and use a wildcard for the destination address (DA). In this instance, the policy will apply to all packets originating at the source address regardless of destination address. Where multiple attributes are set, only an exact match will result in the policy action. Where no policy is specified, the network element will continue to terminate the IP flows at the processor hosting the routing entity.

Steering policies may be designated as either ingress or egress policies. For example, data packets may be treated using ingress policies, whereas control packets may be handled via egress policies. In the embodiment shown in FIG. 3, an ingress policy would be applied by the network processor unit as the IF packet is received and before it is passed to the switch fabric, while an egress policy would be applied by the network processing unit after returning from the switch fabric and before being transmitted out over one of the I/O cards. The invention is not limited in this regard, however, as the policies may be applied entirely at the ingress or entirely at the egress if desired.

The policy may specify an action to be taken upon receipt of a packet that matches the attributes of the policy. For example, the action may specify whether the packet will be forwarded to a particular interface, dropped, or sent to a particular processor 38, 48, for further processing. Note, in this regard, that the application may be started on the data service card processor 48 or on the control service card processor 38. If no action is defined, then the rule will cause the packets to be handled according to a default policy. Policy matching may be prioritized by checking first for a match on SA and/or DA, then by looking for a protocol or port match, and finally checking to see if there is a match on the L5 data, although other ways of finding a policy match may be used as well.

Figure 4:
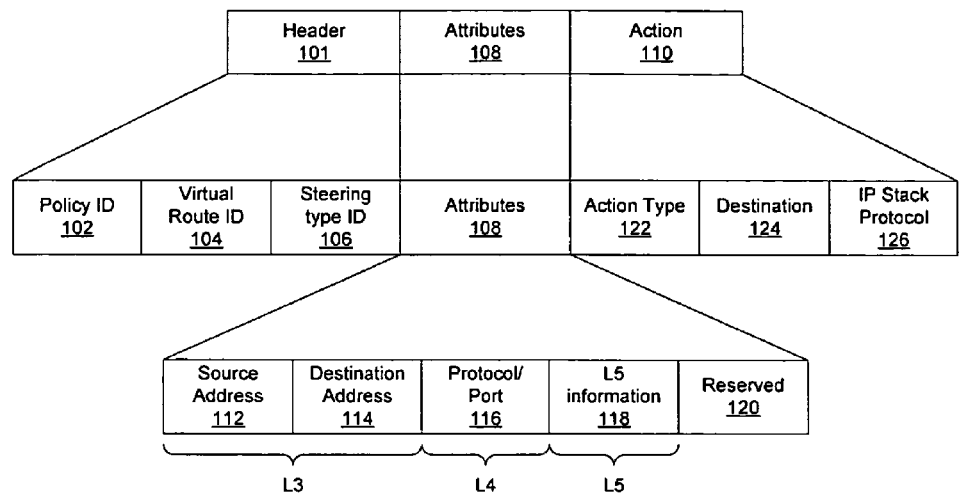
FIG. 4 is a functional block diagram illustrating an example policy format according to an embodiment of the invention.

FIG. 4 illustrates one example of a policy format that may be used in connection with embodiments of the invention. The steering policy format may be determined according to the particular implementation and the invention is not limited to any particular steering policy format.

In the embodiment shown in FIG. 4, the steering policy 100 includes a header 101, attribute fields 108, and one or more action fields 110. The header 101 contains information configured to identify the policy on the network element. For example, the header may contain a policy identifier field 102, a virtual route identifier field 104, and a steering type identifier 106 field.

The policy identifier field may contain a policy ID that is globally unique within the network element. Specifically, since an application may reside on any processor in the network element, and may specify policies that will be applied throughout the network element, it may be advisable to identify the policies in the network element using globally unique policy IDs. Multiple policy ID schemes may be implemented to ensure global uniqueness of the policy ID within the network element. For example, the policy ID may be formed by concatenating a globally unique application ID (which is unique within the network element) with a policy instance number generated by the application and specified as a unique number to that application. Alternatively, a policy ID generator may generate unique policy IDs and distribute the unique policy IDs to the applications in batches to be assigned by the applications as necessary. Other ways of generating policy IDs are possible as well and the invention is not limited to any particular way of generating unique policy IDs.

The virtual route ID field is configured to contain a virtual route ID, which is a well known identifier of the routing entity to which the policy applies. The steering type ID field is configured to be used to specify whether the steering policy is relevant to control or data traffic. Other information may be included in the header as well and the invention is thus not limited to an embodiment that uses this particular header format.

The steering policy 100 may also include one or more attribute fields 108 that may be used to identify the packets. For example, the steering policy may have one or more fields configured to contain layer 3 information such as source address 112 and destination address 114, one or more fields configured to contain layer 4 information such as protocol and port information 116, and one or more fields configured to contain layer 5 information 118 such as tunnel IDs. The attribute information fields 108 may enable other information to be specified as well via reserved fields 120 and the invention is not limited to an implementation that uses this particular format for specifying the policy attributes.

The steering policy may also include a field configured to contain an action part 110 specifying the type of action to be performed on packets matching the attributes defined in the attribute fields 108. The action part may contain three fields, an action type field 122, a destination field 124, and an IP stack protocol field 126. The action type may indicate whether the action will be for the network element to drop the packet or forward the packet, and if the action type indicates that the packet should be forwarded, the destination field 124 contains an address or other indication as to where the packet should be forwarded. Action types are not limited to drop or forward, as other action types may be specified as well. The destination may specify that the packet should be passed to the processor hosting the application that created the policy, or may specify that the packet should be passed to another processor other than the processor hosting the application that created the policy. Other actions may be specified as well and the invention is not limited to an embodiment that supports only these several specified actions.

The action field 110 may also include an IP stack protocol field via which the protocol used by the IP stack of the destination processor may be specified. For example, the IP stack protocol field 126 may specify that the IP stack operates using UDP, TCP, or a Raw type (user specified) protocol. The invention is not limited to the particular protocol indicators able to be carried by the IP stack protocol field.

Policies specified by an application are passed to the steering policy manager 36 for validation. The steering policy manager, upon receipt of a policy, will determine whether the policy is valid and will also determine whether the policy conflicts with any other policies specified by the application or other applications to ensure that the policy is unique within the VR context. Note, in this regard, that policies need only be unique within a particular VR context, not globally on the network element. For example, two applications operating on packets on the same VR should not be allowed to cause all packets from a particular SA/DA pair to be forwarded to different processors. Thus, the steering policy manager is tasked with determining, in the first instance, if a newly received policy may be passed out to the steering policy agents by checking to see if the new policy is valid from a format perspective to see if the new policy identifies packets that are already uniquely identified by another policy.

Table I illustrates several possible valid steering policy formats, with example values, and the possible types of values for the fields that may be specified. To enable the policy to be implemented on the network element, the policy must meet one of the policy formats set forth in Table 1. For example, a policy (line 4 of table I) may specify a particular virtual router ID and a particular destination address, with the protocol and source addresses wildcarded. However, a policy may not wildcard the destination address and then specify a particular protocol or source address since this is not a valid policy format. Thus, table I sets forth several formats that may be used in connection with one embodiment of the invention. Other implementations may enable other formats to be used as well and the invention is thus not limited to an embodiment that uses all the formats set forth in Table I or only the formats set forth in Table I.

TABLE I

| Virtual Router ID | Destination Address | Protocol | Source Address |
|---|---|---|---|
| Wildcarded * | Wildcarded * | Wildcarded * | Wildcarded * |
| Exact Match 12 | Wildcarded * | Wildcarded * | Wildcarded * |
| Exact Match 12 | Sub-net 47.128.0.0/16 | Wildcarded * | Wildcarded * |
| Exact Match 12 | Exact Match 47.128.154.41/32 | Wildcarded * | Wildcarded * |
| Exact Match 12 | Exact Match 47.128.154.41/32 | Exact Match UDP | Wildcarded * |
| Exact Match 12 | Exact Match 47.128.154.41/32 | Exact Match UDP | Sub-net 66.0.0.0/8 |
| Exact Match 12 | Exact Match 47.128.154.41/32 | Exact Match UDP | Exact Match 66.14.23.11/32 |

| Lookup Index | Destination Port | GTP Message Type | GTP Tunnel ID |
|---|---|---|---|
| Wildcarded * | Wildcarded * | Wildcarded * | Wildcarded * |
| Exact Match 636 | Wildcarded * | Wildcarded * | Wildcarded * |
| Exact Match 636 | Port range 2120-2127 | Wildcarded * | Wildcarded * |
| Exact Match 636 | Exact Match 2123 | Wildcarded * | Wildcarded * |
| Exact Match | Exact Match | Exact Match | Wildcarded |

Figure 5:
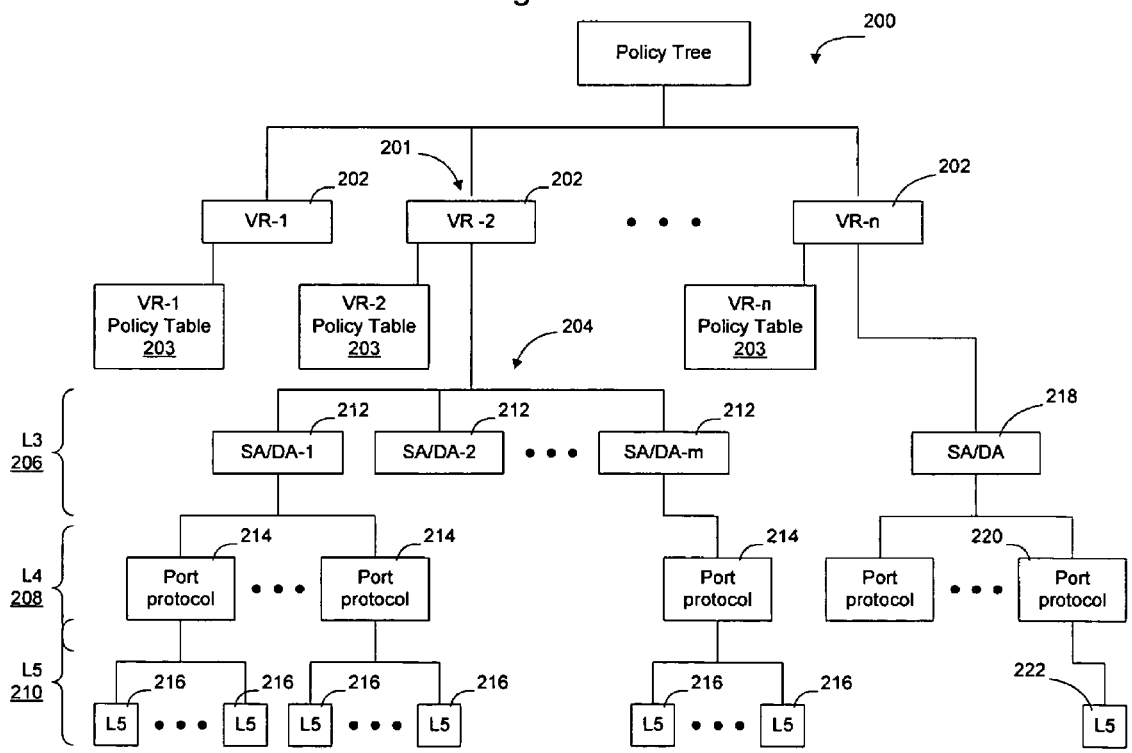
FIG. 5 illustrates a data structure of a validation tree that may be used to validate policies according to an embodiment of the invention.

FIG. 5 illustrates a data structure that may be maintained by the steering policy manager 36 in a steering policy database 37 to keep track of policies in existence on the network element. As shown in FIG. 5, the steering policy manager 36 stores policy information in a policy tree data structure 200. The policy tree data structure 200 includes a separate VR branch 201 for each VR 202. Within a given VR branch 201, the policy tree data structure 200 includes a policy table 203 containing the actual policies for that VR and a verification tree branch 204 which enables new policies to be checked against previous policies to determine whether the policies are unique within that VR context. The verification tree branches at layer 3 (206), layer 4 (208), and layer 5 (210) levels to enable uniqueness to be assured across these policy attributes.

FIG. 6 illustrates the policy table 203 in greater detail. As shown in FIG. 6, the policy table contains a list of policies sorted by policy ID. The policies may take the format illustrated in FIG. 4. The policy table 203 may be configured to be searched using one or more of the header fields, or one or more of the attribute fields. The invention is not limited to the particular data structure used to store the policies in the policy table 203. When a policy is received, the steering policy manager checks the verification tree branch 204 for the VR associated with the policy to determine whether the policy is unique within that VR. According to an embodiment of the invention, the policy manager may determine whether the policy is a duplicate of another policy on the system by determining whether there the verification tree already contains a leaf on the tree for the new policy. If the verification tree for that VR contains the leaf, then another policy exists with the same parameters and the policy is not unique. If the verification tree does not already contain a leaf for the new policy, then the policy is unique within the context of that VR. In this instance, the policy manager will cause a leaf for the new policy to be added to the verification tree under that VR 202 so that subsequent policies may be checked against the new policy.

The policy manager may determine whether a leaf exists for the new policy in a number of ways. For example, the policy manager may start at the root 202 of the branch for that VR and determine whether there are any policies associated with that virtual router. If not, the steering policy manager will add a VR node 202 to the policy tree 200 and add a SA/DA node 212, Port/Protocol node 214, and L5 node 216 to add the leaf to the tree. The steering policy manager will also add an entry to the VR policy table 203. Where the policy does not specify information for one of the lower layers, than those nodes will be omitted. or wildcard entries will be specified at these lower layers When another policy is received for the same VR, the steering policy manager will check first to see if the new policy contains the same L3 data. If it does not, the steering policy manager will add a new SA/DA node 212 to the VR branch 204 and add L4 and L5 nodes below as necessary.

If the new policy contains a SA/DA match, the steering policy manager will determine if there is also a match in layer 4 data. If no match is found at this layer, the steering policy manager will add a port/protocol node 214 and add any L5 nodes specific to the policy. If there is a match at layer 4, the steering policy manager will determine if there is also a match at the layer 5 data. If no match is found, then a L5 node 216 will be added to the tree. If a match is found at the L5 data, the leaf already exists on the verification tree for that VR and, hence, the policy is a duplicate of another policy that has already been passed to the steering policy agents and, as such, the policy must be rejected. The application generating the policy will be notified in this instance of the policy conflict to enable appropriate action to be taken.

Thus, to determine if a new policy is a duplicate of an earlier received policy, the steering policy manager will check (within a given VR branch) first for a match in layer 3 data, if a match is found it will check for a match in layer 4 data and, if a match is found there, it will check for a match in layer 5 data. If a match is found at all three layers for the same VR, then the policy will be rejected as a duplicate of an earlier policy. If no match is found, the policy will be added to the policy tree by causing new nodes to be generated form the data specified in the policy and added to the verification tree. In this manner, future policies may be checked against the new policy and a policy verification tree may be built as policies are generated by the applications.

When a policy is deleted by an application, the steering policy manager will delete the policy from the VR policy tree 203 and remove the policy leaf nodes unique to that policy. To remove the policy from the verification policy tree, the policy manager will search the verification tree to determine which nodes 212, 214, 216 are specific to the policy. Since every policy is unique, each policy will have at least a L5 node that is unique and must be removed. When a node is removed from the tree, the policy manager will determine if the node immediately above the removed node has no dependent leaves. For example, when the L5 node is removed, the policy manager will determine if the L4 node 214 has any other L5 nodes dependent on it. If there are other L5 nodes in the verification tree depending from that L4 node, other policies exist which specify the L4 data and the removal process may terminate. However, if there are no other L5 nodes attached to the L4 node, the L4 node may be removed as well. This process iterates starting at the L5 layer and working up through the L4 and L3 layers to determine which nodes are required to remain in the verification tree. Nodes that are not required may be removed.

Once a policy is validated and is determined to be unique, it is passed to the steering policy agents to be implemented as filter rules. Filtering of packets is well know in the art and, accordingly, will not be described in greater detail herein. Any filtering format may be used without departing from the scope of the invention.

When a packet is received on the ingress data service card 42, L2 and L3 classification is performed and a Forwarding Information Base (FIB) lookup is performed. If a lookup results in a local interface (on box), the packet will be processed against the filter rules to see if a policy has been set by an application for the packet. If a match is found, the packet is steered to the destination service group (interface) as specified by the policy. If no policy match is found, a default rule is applied to the packet to cause the packet to be forwarded to the egress interface determined from the FIB lookup.

The SPM may be started as a process on a control service card and, optionally, a backup SPM process may be started on a second control service cards. IP applications across the system will register policies with the SPM. Where the SPM is running on both an active and standby CSCs, the SPM will journal all the policy data to the spared card. The number of policies that the SPM can store in the SPM policy database 86 may be limited in a practical implementation, although the invention is not limited in this manner.

Upon startup, such as upon startup of a data service card, a steering policy agent will synchronize with the steering policy manager to receive a list of policies. The steering policy manager will determine which VRs will reside on the processor associated with the steering policy agent and will then download the policies for those VRs to the steering policy agent. Where the filter rules are to be programmed into the network processing units of the data service cards, as shown in FIG. 3, a given data service card will only receive policies for VRs resident on that data service card. In this way, only policies relevant to traffic to be received on a data service card will be programmed into the network processing unit for the data service card to reduce the number of filter rules that must be programmed in any given data service card.

Policies may optionally specify the application that generated the policy so that, upon termination of the application, the policies may be deleted. To enable applications to be uniquely identified in the network element, an application 1D generator 39 may be provided to generate application IDs for applications as the applications are created on the system. Application IDs may take any form, such as a 32 bit value including an application type value and local application ID value. The invention is not limited in this manner, however, as other forms of the application ID may be used as well depending on the particular implementation. Application IDs may be configured to persist across application restarts, card resets, and chassis reboots. However, if an application is deleted and recreated with the same name, a different global application IDs may be assigned.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The steering policy manager, steering policy agents, and other logical entities described herein, may be embodied as one or more software programs implemented in control logic on a processor on the network element 20. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible computer readable_medium such as a read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element, comprising:
    a first processor containing control logic configured to implement an Internet Protocol (IP) application process;
    a second processor containing control logic configured to implement a Virtual Private Network (VPN) routing entity; and
    control logic configured to implement a steering policy manager,
    wherein the IP application process is operating in the context of the VPN and requires access to IP flows over the VPN, the IP application process being configured to generate policies associated with IP packet flows on the network element and pass the policies to the steering policy manager, and
    wherein the policies manager is configured to implement the steering policies by passing the policies to at least one steering policy agent configured to enable IP packets in the IP packet flows to be affected by the policies, so that the IP application process associated with the VPN may obtain access to the IP flows over the VPN even though it is instantiated on the first processor rather than being instantiated on the second processor hosting the VPN routing entity.

2. The network element of claim 1, wherein the control logic configured to implement the steering policy manger is contained on the second processor.

3. The network element of claim 1, wherein the policies each comprise a header containing information that may be used to identify a policy in the network element, attributes containing IP packet flow identification information that may be used to identify packets within an IP packet flow associated with the policy, and action information specifying an action to be taken on IP packets in the IP packet flow associated with the policy.

4. The network element of claim 1, wherein the steering policy manager is further configured to verify a format of the policies against a plurality of available formats.

5. The network element of claim 1, wherein the steering policy manager is further configured to determine if the policies generated by the IP application process are unique with respect to packets associated with the VPN routing entity by checking new policies against a steering policy verification tree containing policy information from previous policies.

6. A method for specifying Internet Protocol (IP) termination in a network element having a plurality of processors, the method comprising the steps of:
    defining a policy by an IP application running on a first processor of the plurality or processors and associated with a Virtual Private Network (VPN) routing entity running on a second processor of the plurality of processors, the IP application operating in the context of the VPN and requiring access to IP flows over the VPN;
    passing the policy to a steering policy manager;
    implementing the policy, by the steering policy manager, by passing the policy to a steering policy agent configured to direct IP packets meeting the policy to the first processor rather than to the second processor, so that the IP application associated with the VPN may be instantiated on the first processor rather than being required to be instantiated on the second processor hosting the VPN routing entity.

7. The method of claim 6, wherein the policy contains attributes and an action, said attributes comprising at least one of layer 3 through layer 5 data.

8. The method of claim 7, wherein the steering policy agent is configured to program a network processor unit to cause packets to be filtered according to the attributes defined in the policy.

9. The method of claim 8, wherein the steering policy agent is configured to program a network processor unit to cause the action to be taken on packets matching the attributes.

10. The method of claim 7, wherein the steering policy agent is resident in an IP stack of the second processor.

11. The method of claim 10, wherein the steering policy agent is configured to filter packets according to the attributes defined in the policy.

12. The method of claim 11, wherein the steering policy agent is configured to cause the action to be taken on packets matching the attributes.

13. The method of claim 6, further comprising the step of:
    verifying the policy, by the steering policy manager, to determine if the policy is a duplicate of another policy.

14. The method of claim 13, wherein the step of verifying comprises comparing the attributes of the policy with layer 3 through layer 5 data of other policies for the VPN routing entity.

* * * * *

UNITED STATES PATENT AND TRADEMARK OFFICE
CERTIFICATE OF CORRECTION

| | | |
|---|---|---|
| PATENT NO. | : 7,869,442 B1 | Page 1 of 1 |
| APPLICATION NO. | : 11/241612 | |
| DATED | : January 11, 2011 | |
| INVENTOR(S) | : Ameel Kamboh et al. | |

It is certified that error appears in the above-identified patent and that said Letters Patent is hereby corrected as shown below:

Col. 6, line 11, "the IF packet" should read --the IP packet--;

Col. 10, line 50, "application 1D" should read --application ID--; and

Claim 6, line 5, "plurality or processors" should read --plurality of processors--;

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,869,442 B1
APPLICATION NO. : 11/241612
DATED : January 11, 2011
INVENTOR(S) : Ameel Kamboh et al.

Page 1 of 1

It is certified that error appears in the above-identified patent and that said Letters Patent is hereby corrected as shown below:

Col. 6, line 11, "the IF packet" should read --the IP packet--;
Col. 10, line 50, "application 1D" should read --application ID--; and
Column 12, line 20 (Claim 6, line 5) "plurality or processors" should read --plurality of processors--;

This certificate supersedes the Certificate of Correction issued April 12, 2011.

Signed and Sealed this
Tenth Day of May, 2011

David J. Kappos
*Director of the United States Patent and Trademark Office*